UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

MANUFACTURE AND PRODUCTION OF ERYTHRENE.

1,056,816.   Specification of Letters Patent.   Patented Mar. 25, 1913.

No Drawing. Original application filed December 6, 1911, Serial No. 664,136. Divided and this application filed March 2, 1912. Serial No. 681,283.

*To all whom it may concern:*

Be it known that we, GEORG MERLING and HUGO KÖHLER, doctors of philosophy, chemists, citizens of the German Empire, residing at Elberfeld, Germany, have invented new and useful Improvements in the Manufacture and Production of Erythrene, of which the following is a specification.

The present application is a divisional application of our application Serial No. 664,136, filed December 6, 1911 and concerns the manufacture and production of erythrene by distilling with a caustic alkali or an earth alkali, the halogen ammonium halogenid of the formula:

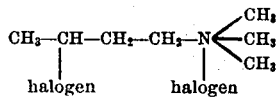

In order to illustrate the new process more fully the following example is given, the parts being by weight:—

*Manufacture and production of erythrene from the tetra-ammonium chlorid:*

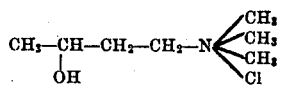

This ammonium chlorid which can be obtained by directly combining the oxy base:

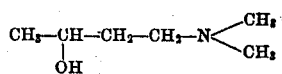

with methyl chlorid or by converting the ammonium iodid thereof with silver chlorid is a colorless, deliquescent crystal mass. It is dissolved in about 5 parts of water and the well cooled solution is saturated with hydrobromic acid or hydrochloric acid, and heated in an autoclave on the boiling water bath for about 24 hours. When the clear solution is evaporated on the water bath or the water and the superfluous hydrogen-halid is separated in another suitable manner, the bromo- or chloro-ammonium chlorid:

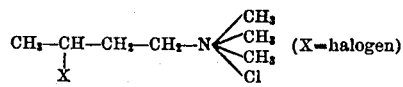

remains as a thick brown syrup, which is distilled with about three times its quantity of pulverized caustic potash or soda or also with calcium or barium hydroxid with or without the addition of alcohol or water. The erythrene thus obtained is led through dilute sulfuric acid, dried over calcium chlorid and condensed by cooling. The yield is nearly theoretical.

We claim:—

1. The process for producing erythrene, which process consists in first heating with an alkali a halogen-ammonium-halogenid having the hydrocarbon radical:

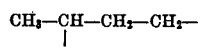

and secondly isolating the erythrene from the resulting mixture, substantially as described.

2. The process for producing erythrene, which process consists in first heating with an alkali a halogen-ammonium-halogenid of the formula:

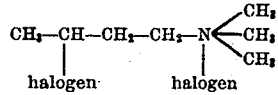

and secondly isolating the erythrene from the resulting mixture, substantially as described.

In testimony whereof we have hereunto set our hands in the presence of two subscribing witnesses.

GEORG MERLING. [L. S.]
HUGO KÖHLER. [L. S.]

Witnesses:
 HELEN NUFER,
 A. NUFER.